United States Patent [19]

Powell, II et al.

[11] Patent Number: 5,633,895

[45] Date of Patent: May 27, 1997

[54] COMMUNICATION DEVICE WITH SYNCHRONIZED ZERO-CROSSING DEMODULATOR AND METHOD

[75] Inventors: Clinton C. Powell, II, Lake Worth; Edward K. B. Lee, Sunrise, both of Fla.; Hyuck M. Kwon, Wichita, Kans.

[73] Assignee: Motorola, Inc., Schaumburg, Ill.

[21] Appl. No.: 511,081

[22] Filed: Aug. 3, 1995

[51] Int. Cl.[6] .................................................. H04L 27/16
[52] U.S. Cl. ......................... 375/324; 375/336; 375/355
[58] Field of Search .................................. 375/334, 355, 375/360, 336, 340, 329, 324, 323; 329/300

[56] References Cited

U.S. PATENT DOCUMENTS

| | | | |
|---|---|---|---|
| 4,466,108 | 8/1984 | Rhodes | 375/361 |
| 5,376,894 | 12/1994 | Petranovich | 375/324 |
| 5,453,715 | 9/1995 | Lee | 375/324 |
| 5,469,112 | 11/1995 | Lee | 375/340 |
| 5,574,399 | 11/1996 | Oura et al. | 375/324 |

OTHER PUBLICATIONS

John Park, "An FM Detector for Low S/N", IEEE T–Comm, vol. Com–18, No. 2, Apr. 1970.

*Primary Examiner*—Tesfaldet Bocure

[57] ABSTRACT

A communication device with a synchronized zero-crossing demodulator is described. A synchronizer system (123, 223, 125, 227) and method derives symbol transition timing information from a zero-crossing detector output. The synchronizer (123, 223) is, in one embodiment, connected to the output of a zero-crossing detector (120, 220), to provide an edge clock signal to a phase angle estimator (122, 226), which is passed to a decision device 124, which provides a symbol estimate which is later decoded into an information message. In an alternative embodiment, a synchronizer is combined with the phase angle estimator (125, 227) to provide as an output, a phase angle estimate which is passed to a decision device (124) which provides a symbol estimate signal (127, 229), which is later decoded to obtain the information message. The alternative embodiment allows recovery of the second symbol which is typically lost in implementing the first embodiment of the system, to avoid second order error effects on recovered data.

20 Claims, 12 Drawing Sheets

| Z.C. SYNCHRONIZER WITH WEIGHTED AVERAGE $\check{T}$ ||||
|---|---|---|---|
| $E_b/N_o$ | BIT 1 | BIT 0 | NO. SYMBOLS |
| 0 | .265 | .386 | 41.6.k |
| 2 | .183 | .323 | 41.6.k |
| 4 | .102 | .238 | 41.6.k |
| 6 | .0414 | .138 | 41.6.k |
| 8 | .0104 | .0593 | 41.6.k |
| 10 | 1.24E-3 | .0151 | 124.9k |
| 12 | 7.2E-5 | 1.7E-3 | 416.6k |
| 14 | 1.44E-6 | 7.82E-5 | 2.0833M |

*FIG. 11*

| HARD-WIRED SYNCHRONIZER ||||
|---|---|---|---|
| $E_b/N_o$ | BIT 1 | BIT 0 | NO. SYMBOLS |
| 0 | .288 | .401 | 41.6.k |
| 2 | .203 | .338 | 41.6.k |
| 4 | .113 | .251 | 41.6.k |
| 6 | .0447 | .145 | 41.6.k |
| 8 | .0108 | .0625 | 41.6.k |
| 10 | 1.26E-3 | .0159 | 124.9k |
| 12 | 9.21E-5 | 1.84E-3 | 416.6k |
| 14 | 3.36E-6 | 9.64E-5 | 2.0833M |

*FIG. 12*

COMMUNICATION DEVICE WITH SYNCHRONIZED ZERO-CROSSING DEMODULATOR AND METHOD

TECHNICAL FIELD

This invention is generally related to communication devices and methods of communication, and more particularly to digital communication devices and methods of conducting digital communications.

BACKGROUND OF THE INVENTION

Many demodulators used in digital communication devices use zero-crossings to determine the polarity of the demodulated signal. In zero IF (Intermediate Frequency) applications, signal phase information can be extracted from the zero-crossings of the in-phase and out-of-phase, e.g., quadrature signals. These zero-crossings are detected by appropriate circuitry to demodulate the carrier signal and reconstruct the originally transmitted information signal.

In general, digital signals may be demodulated in various ways. In U.S. Pat. No. 4,322,851, issued Mar. 30, 1982, Ian Vance teaches a method of demodulating a binary FSK signal. This technique uses the direction of the phase rotation angle to detect signal polarity. A significant problem with this approach is its inability to modulate multi-level digital signals.

To overcome this limitation, a Cross-Differentiate-Multiply (CDM) demodulation technique may be employed. This technique is detailed in an article titled "An FM Detector for Low S/N" written by John Park and published in IEEE T-Comm. Vol. Com-18, No. 2, April, 1970. This technique is highly complicated and requires two differentiators, four multipliers, one divider, and two summers. The number of devices used, and hence, their current drain is very large. This makes the technique impractical for use, particularly in battery operated, portable communication applications.

Yet another approach employs the $\tan^{-1}$ (inverse tangent) operation $\{[q(t)]/[i(t)]\}$ with digitized i and q signals. This technique requires two analog-to-digital converters and a processor. Once again the current drain is very high, particularly for use in battery powered, portable applications.

In a recently filed application entitled "Communication Device With Zero-Crossing Demodulator," Ser. No. 08/290,161, filed Aug. 15, 1994, now issued as U.S. Pat. No. 5,469,112 on Nov. 21, 1995 a method and device are described for demodulating multi-level digital signals. In that system there is provided phase axes generators, a zero-crossing detector, a phase angle estimator, and a decision device to use the i and q components of signals to demodulate even multi-level digitally modulated signals. The direction of the phase at zero-crossings and the phase rotation angles are used to estimate the contents of M-ary signals. In achieving its performance, a fixed reference (or hard-wired) synchronization clock is used. This fixed reference hard-wired clock has in the past been implemented in a simulation environment, and is not realizable in the field. Symbol synchronization, an equally important part of the demodulator, is, however, necessary. However, due to the nature of the detector, standard synchronization techniques, i.e., PLL (phase locked loop), or level crossing, cannot be employed.

A synchronization device and method is therefore desired which can be employed with the zero-crossing differential detector, and which exhibits little loss when compared to the use of the hard-wired clock.

BRIEF DESCRIPTION OF THE DRAWINGS

FIGS. 11 and 12 are tables, respectively, comparing the operation of system using a hard-wired counter as compared to the synchronization scheme in accordance with one embodiment of the invention.

DETAILED DESCRIPTION OF THE PREFERRED EMBODIMENTS

Some digital FSK demodulation schemes estimate transmitted data by estimating a phase rotation direction at zero-crossing points. The performance of such demodulation schemes varies with the number of zero-crossing points. An increase in the number of measurements of a phase rotation direction at zero-crossing points improves the performance of the demodulator, and increases the maximum transmit bit rate at a given frequency deviation.

An application entitled "Communication Device With Efficient Zero-Crossing Generator," Ser. No. 08/296,139, filed Aug. 26, 1994, the disclosure of which is specifically incorporated by reference herein, describes a method for increasing the number of zero-crossings. Further, in the previously referenced application entitled "Communication Device With Zero-Crossing Demodulator," Ser. No. 08/290, 161, filed Aug. 15, 1994, now issued as U.S. Pat. No.

5,469,112 on Nov. 21, 1995 the disclosure of which is also specifically incorporated by reference herein, there is described the use of a bi-directional counter, which is hard-wired, to capture phase rotation angle information. The output of the counter is used by a decision device to produce a demodulated signal.

In these types of systems, in general, a received signal is converted to zero IF either directly or through multiple conversion stages. Traditionally, the conversion is accomplished through two mixers which produce an in-phase (i) and an out-of-phase (q), e.g., quadrature phase signal. The i and q signals are used in the recovery of the transmitted information signal. One technique determines the polarity of the bit by estimating the phase rotation direction. A phase rotation direction may be determined by sampling q waveforms at i zero-crossings, and i wave forms at q zero-crossing points. Estimating the phase rotation direction in demodulating digital signals is limited to binary applications. In accordance with the system of application Ser. No. 08/290,161, filed Aug. 15, 1994, now issued as U.S. Pat. No. 5,469,112 on Nov. 21, 1995 the i and q components are used to demodulate even multi-level digitally modulated signals. In addition to the direction of the phase at zero-crossings, the noted system estimates the phase rotation angles to determine the contents of the M-ary signals.

The present invention implements the principles of prior application Ser. No. 08/290,161, filed Aug. 15, 1994, now issued as U.S. Pat. No. 5,469,112 on Nov. 21, 1995 in combination with a synchronization scheme which replaces the use of a hard-wired bi-directional counter which keeps track of positive and negative phase rotations.

Figure 1:
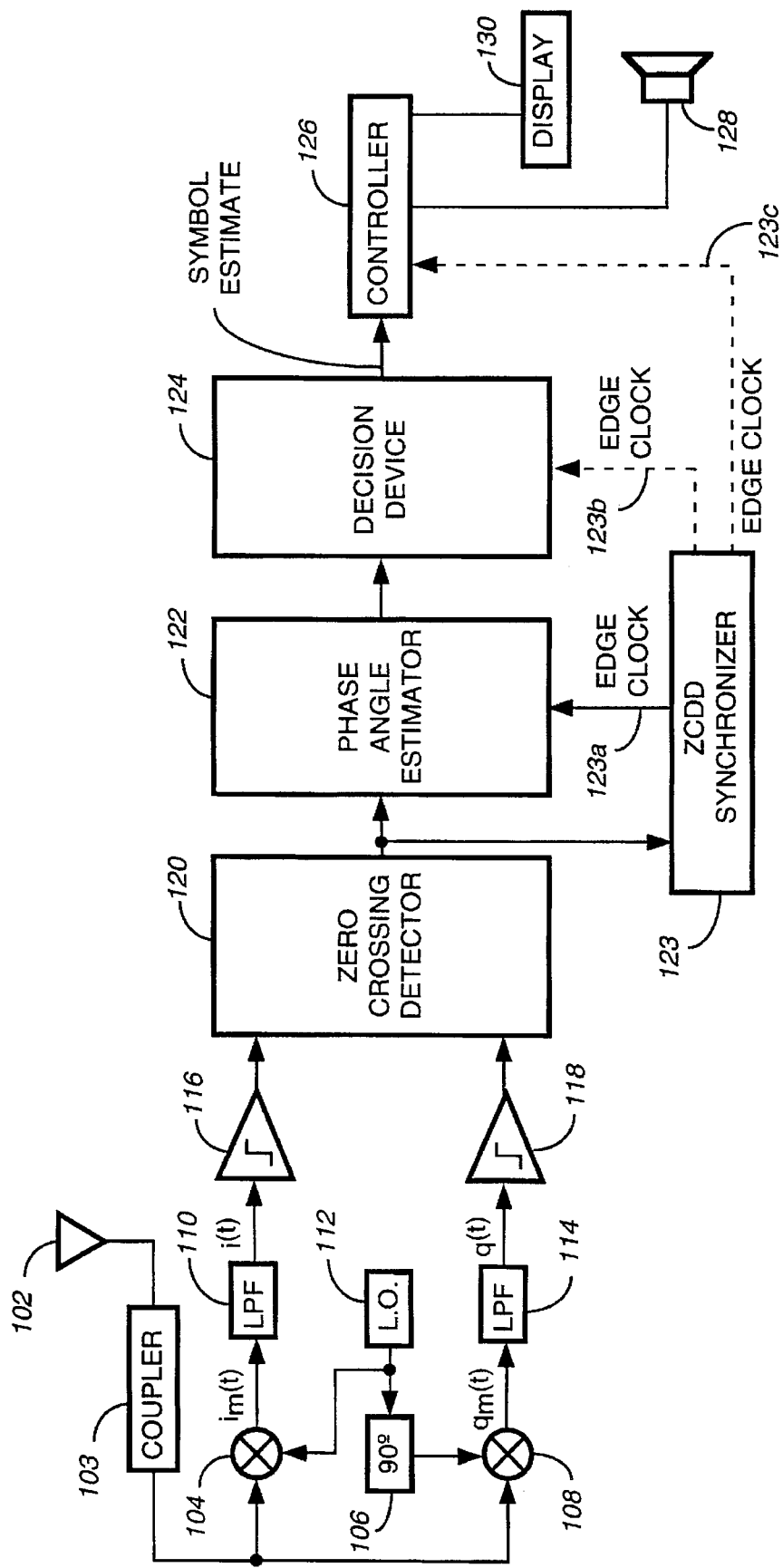
FIG. 1 shows a block diagram of a communication device in accordance with the present invention.

To better understand the principles of the present invention, reference is made to the drawings and in particular to FIG. 1. This figure shows relevant portions of a communication device 100 having a differential zero-crossing demodulator. A radio frequency signal, received at an antenna 102, is converted to zero IF through two mixers 104,108. Those of ordinary skill in the art may appreciate that an intermediate conversion stage may be employed before the zero IF signal is generated. This optional intermediate conversion stage is implemented by a coupler 103. An oscillator 112 provides a local oscillator (LO) signal for mixer 104. The local oscillator signal for the mixer 108 is supplied through a 90° phase shifter 106. The output signals of the mixers 104, 108 are filtered at low pass filters, i.e., LPFs, 110, 114 to produce the i and q signals. These signals are hard limited at limiters 116, 118 to ±1, before being applied to a zero-crossing detector 120.

Means for detecting the direction of instantaneous phase rotation of zero-crossings, such as the detector 120, detects zero-crossings, using, for instance, a flip-flop with an edge-triggered clock input, and presents its findings to means for accumulating all the zero-crossings, i.e., phase angle estimator 122, and to means for estimating a symbol transition time, i.e., zero-crossing differential detector synchronizer 123. The phase angle estimator 122 accumulates all of the zero-crossings, and based upon a symbol edge clock signal received from the synchronizer 123, estimates the phase angle rotation of the information signal based upon all of the accumulated zero-crossings and the previous and present clock signal received from the synchronizer 123. It should be noted that by the term "accumulates" is meant to count and add simultaneously. Alternatively, the same result can be achieved by simply counting and then adding at the next symbol transition time as discussed hereafter.

More specifically, symbol synchronization is achieved through the use of the zero-crossing differential detector synchronizer 123 connected to the output of the zero-crossing detector 120. The synchronizer 123 estimates a symbol transition time and updates the clock signal for transmission to the phase angle estimator 122 only when at least two, non-zero consecutive zero-crossing samples are detected in which the first sample is of one phase and the second sample is of the other phase. More preferably, at least four, non-zero consecutive zero-crossing samples are detected in which the first two samples are of one phase and the second two samples are of the other phase. This allows for overlooking the effects of noise where a zero-crossing could be inadvertently detected, when in fact none occurred, if only two samples are detected. The prior art fails to recognize detection of zero-crossings through the detection of non-zero crossing samples. Such a phase angle estimator 122 can be implemented in a conventional manner through the use of bi-directional counters as will be readily apparent to those of ordinary skill in the art.

As compared to the performance of the system of previously filed application Ser. No. 08/290,161, filed Aug. 15, 1994, now issued as U.S. Pat. No. 5,469,112 on Nov. 21, 1995 which employs a counter which is hard-wired to the phase angle estimator 122, the performance of the synchronizer 123 exhibits little loss when compared to that of the hard-wired, non-realizable clock of the prior application. This synchronization operation and its implementation is explained hereafter.

However, prior to discussing the synchronization operation, it is noted that in explaining the operation of the communication device 100, the signal received at the antenna 102 is assumed to be a CPFSK (Continuous Phase Frequency Shift Keying) signal, of the type well known to those of ordinary skill in the art. Such a signal may be represented as:

$$\cos(w_c t + \theta(y))$$

where $$\theta(t) = \frac{\pi h}{T} \int d(t) dt,$$

T is a symbol of time duration, and d(t) is a transmitted data waveform. It is noted that MSK (Minimum Shift Keying), and GMSK (Gaussian Minimum Shift Keying) are special cases of CPFSK with a modulation index (h) of 0.5. The phase rotation angle for a CPFSK signal over a symbol time may be described as follows:

$$\begin{aligned}
\Delta\Theta(t) &= \theta(t) - \theta(t-T) \\
&= \frac{\pi h}{T} \left( \int^t d(t)dt - \int^{(t-T)} d(t)dt \right) \\
&= \frac{\pi h}{T} \int^t_{(t-T)} d(t)dt
\end{aligned}$$

The above equation indicates that $\Delta\Theta(t)$ may be used to detect d(t). For MSK signals, $\Delta\Theta(t)$ is $$\frac{\pi}{2}$$

when d(t) is equal to 1, and $$-\frac{\pi}{2}$$

when d(t) is equal to −1 in the absence of noise.

Figure 5:
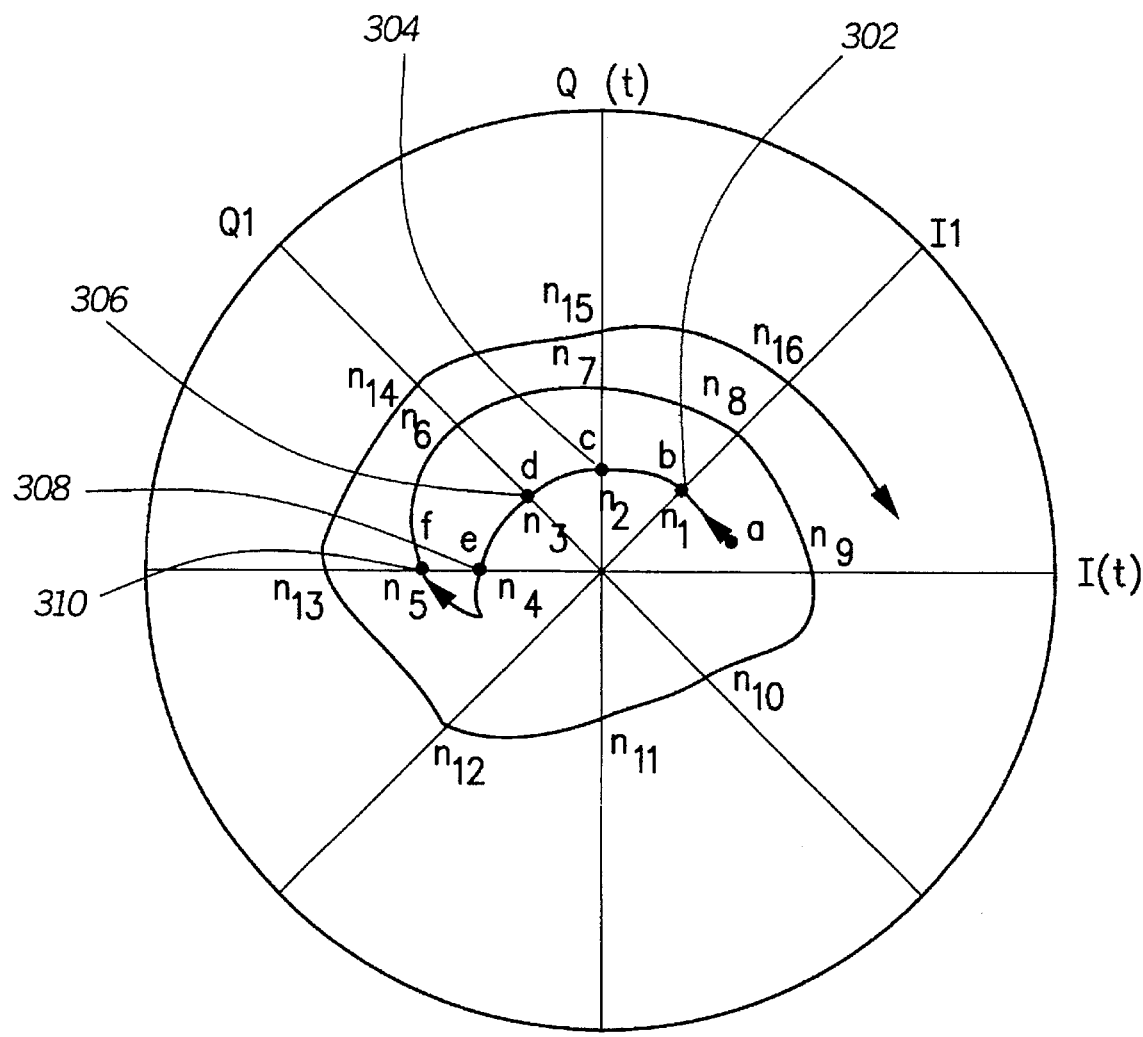
FIG. 5 shows a phase vector diagram depicting the phase rotation direction and zero-crossings of a transmission operated on in accordance with the present invention.

As stated, the preferred operation of the demodulator is based upon I and Q zero-crossings. In the phase domain, for example, as disclosed herein in a cartesian coordinate system in FIG. 5, where the signals are disclosed in terms of magnitude and phase, i.e., vectors, the detector 120 detects the instantaneous phase rotation at zero-crossings. In the time domain, FIG. 6, i and q values are monitored at zero-crossings of Q and I, respectively. To better understand this operation, reference is made to the phase diagram 300, as shown in FIG. 5, for a better understanding of the I and Q zero-crossings. When the i waveform goes from positive to negative, or from negative to positive, the phase trajectory in the phase diagram 300 crosses the Q axis. q values at I zero-crossings indicate the direction of phase rotation. The zero-crossings of i and q waveforms may be viewed as the phase crossings of I and Q axes (also, $I_1$ and $Q_1$ axes as explained hereafter) in the phase diagram 300. A positive phase axis crossing means that the phase trajectory crosses the I or Q axis (or $I_1$ or $Q_1$ axis) in a positive direction (counter-clockwise). Similarly, a negative phase axis crossing means that the phase trajectory crosses the I or Q axis (or $I_1$ or $Q_1$ axis) in a negative direction (clockwise). The zero-crossing detector 120 sets its output high if the phase trajectory crosses either axis in a positive direction. A low output is produced when the phase trajectory crosses either axis in the negative direction.

As discussed above, referring to FIG. 5, it is noted that the number of zero-crossings are increased, for example, by setting up a set of axes $Q_1$ and $I_1$ in a manner as discussed in the previously referenced application Ser. No. 08/296, 139, filed Aug. 26, 1994.

Thus, in the system of FIG. 1, as the phase relationship of the i and q waveforms changes, the detector 120 detects zero-crossings and transmits this information to the estimator 122 and the synchronizer 123. The estimator 122 keeps track of the number of times a positive or negative phase change was detected.

Figure 6:
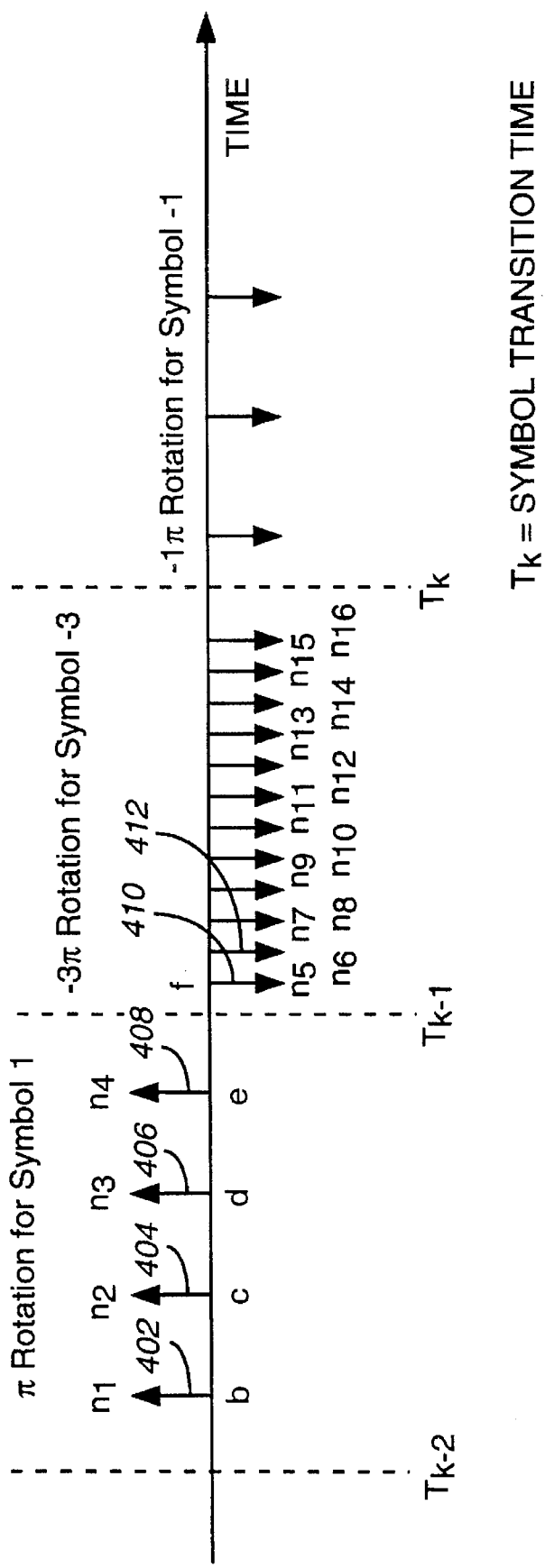
FIG. 6 shows the time representation of the phase rotation diagram of FIG. 5 and the zero-crossings thereof in phase trajectory diagram and time domain.

FIG. 6 illustrates the type of signal generated by the zero-crossing detector 120. From the output thereof a method must be employed in which the symbol transition time can be determined, i.e., $T_k$.

The operation of synchronizer 123 is now explained. For purposes of explanation, if it is assumed that transmitted four-level symbols consist of ±1 and ±3, the method and device of the invention can be easily extended for the general M-ary case. For a four-level CPFSK case, the modulation index h is equal to one (π rotations) and three (3π rotations) for the inner ±1 and outer ±3 symbols respectively. FIG. 6 shows the zero-crossing detector output when the sequence 1, −3, −1 is transmitted. In this case, the phase rotation direction is changed from the positive (counter-clockwise) to the negative (clockwise) direction. The symbol transition has most likely occurred at the clock sample between $n_4$ and $n_5$. In accordance with the invention, instead of assuming the zero-crossing occurs at the midpoint between two out-of-phase symbols, it becomes possible to more accurately determine at what point between the symbols the zero-crossing occurred. This is important for synchronization of the information signal decoding, particularly when there is a varying speed of rotation of the signals.

In accordance with the invention, a synchronization algorithm is implemented in synchronizer 123, to update the symbol transition times for use by the phase angle estimator 122 as follows. Reference is now made to the phase diagram 300 of FIG. 5, and to its time-equivalent diagram 400 of FIG. 6.

In these diagrams, the phase rotation from an arbitrary position "a" is traced. The parenthetical designator hereafter refers to the time chart 400 of FIG. 6. A zero-crossing in the positive rotation is shown by 302 (402), as commonly designated by the letter "b" in both diagrams. A second positive zero-crossing 304 (404) is encountered at the Q axis. The phase diagram continues with a third zero-crossing 306 (406). A fourth crossing occurs at 308 (408). After the fourth zero-crossing, the phase rotation makes a directional change and starts a clockwise rotation. A negative zero-crossing is encountered at the I axis 310 (410). As can be seen, the negative zero-crossing is shown by a negative vector on the time chart 400. This is intended to facilitate the understanding of the difference between a positive and negative phase rotation angle. This difference is captured by the synchronization scheme in accordance with the invention as previously described.

Although only two, non-zero crossing samples can be used for synchronization, if four consecutive, non-zero crossing samples are detected, whenever the sign of the zero-crossing detector output samples change, such that the sequence of the non-zero samples become [+1, +1, −1, −1] or [−1, −1, +1, +1], the four non-zero samples and corresponding time information are registered in the synchronizer 123. For purposes of this description, it is noted that "time information" refers to the times which, for purposes of FIGS. 5 and 6, correspond to the specific points $n_3$, $n_4$, $n_5$, and $n_6$, or the relative times as shown in differential form in FIG. 7, step 512, i.e., $d_{12}$, $d_{23}$, and $d_{34}$. The relative time in differential form, i.e., $d_{12}$, refers to the time differential between zero-crossing times $n_3$ and $n_4$, as reflected in the example of FIGS. 5 and 6. To register a zero-crossing, at a minimum there should be four, non-zero samples in which the first two samples are of one phase and the second two samples are of the other phase.

By requiring that a first two or more, non-zero consecutive samples are the same phase, i.e., both + or both −, and a second two or more are of the other phase from the first two or more, when identifying a symbol transition, there is reduced the probability of detecting an incorrect symbol transition. Of course, reliability can be further enhanced, for example, having more than four, non-zero samples. In such a case, the first three or four, or more, as appropriate, are of one phase, and correspondingly, the next three, four, or more, as appropriate, are of the other phase. The effect of having at least four samples with the first two or more of one phase and the next two or more of another phase is to eliminate noise which can appear as a single reversed phase sample, and which absent the invention would cause it to be estimated as a symbol transition time. The exact number of sample and time information registers in the synchronizer 123 varies as a function of the modulation indices, and the number of axes generated by the phase axes generators for use by the zero-crossing detector. This defines the minimum number of zero-crossing outputs per symbol. The number of registered zero-crossings "m" in the synchronizer 123 is chosen to satisfy the relationship m<2n, where "n" is the minimum number of zero-crossing outputs per symbol.

In the example given, where four non-zero samples are employed to determine a zero-crossing, the four non-zero sample and time information registered zero-crossing pairs consist of ($s_3$, $n_3$), ($s_4$, $n_4$), ($s_5$, $n_5$), and ($s_6$, $n_6$). In most cases there may be more than one sample between consecutive non-zero samples which varies as a function of the number of samples taken per symbol over a sampling rate. From this information, an estimate $\check{T}$ of the symbol transition time can be defined as:

$$\check{T} = \text{int}\left( \frac{n_4(n_6 - n_5) + n_5(n_4 - n_3)}{(n_4 - n_3) + (n_6 - n_5)} \right)$$

in the above equation, "int" is the truncated equivalent of the real valued expression or integer part, i.e., any fraction is discarded. The above equation obtains a weighted average $\check{T}$ which is preferred to that of a simple average of $n_4$ and $n_5$, as would be generated in a two non-zero sample case, which is more appropriate due to the multi-level symbol transitions.

If only two non-zero crossing samples are used instead of four, the estimate $\check{T}$ of the symbol transition time can be defined as:

$$\check{T} = \text{int}\left( \frac{n_4 + n_5}{2} \right)$$

for a simple average, and more preferably $$\check{T} = \text{int}\left( \frac{n_4(n_6 - n_5) + n_5(n_4 - n_3)}{(n_4 - n_3) + (n_6 - n_5)} \right)$$

for a weighted average. In the case the weighted average equation is used in the case of only two samples, only $n_4$ and $n_5$ need be opposite phases. Likewise, for more than four non-zero crossing samples, the symbol transition time $\check{T}$ is a weighted average and can be determined from similar equations as may be easily derived in a routine maner by those of ordinary skill in the art. For example one possible equation for use with six non-zero samples is:

$$\check{T} = \text{int}\left( \frac{n_4(n_7 - n_5) + n_5(n_4 - n_2)}{(n_4 - n_2) + (n_7 - n_5)} \right)$$

While in the case of two non-zero samples being used it is possible to use a simple average to obtain the symbol transition time, it is preferred, even in the case of only two non-zero samples, that a weighted average $\check{T}$ of symbol transition time be obtained as shown above. In such a case, while $n_4$ and $n_5$ need to be of opposite phases from each other, $n_3$ and $n_6$ can be of the same phase as either one of $n_4$ or $n_5$ or any other combination. What is important is that a weighted average $\check{T}$ is obtained which is not just simply at the midpoint between two opposite phase non-zero samples. Instead, this calculation takes into account differing speeds of rotation of the information signal to more closely determine the actual zero-crossing time between two opposite phase non-zero samples.

In accordance with the invention, two methods of updating the weighted average $\check{T}$ are provided. One method of updating the weighted average $\check{T}$ is to do so whenever the sequence indicating a phase change is detected or sequentially processed. A second method of updating the weighted average $\check{T}$ is to base it upon the average weighted average $\check{T}$ for a finite number of symbols, i.e., a block process. The estimated symbol transition time is then used to update the edge clock occurring once every symbol period.

Figure 7:
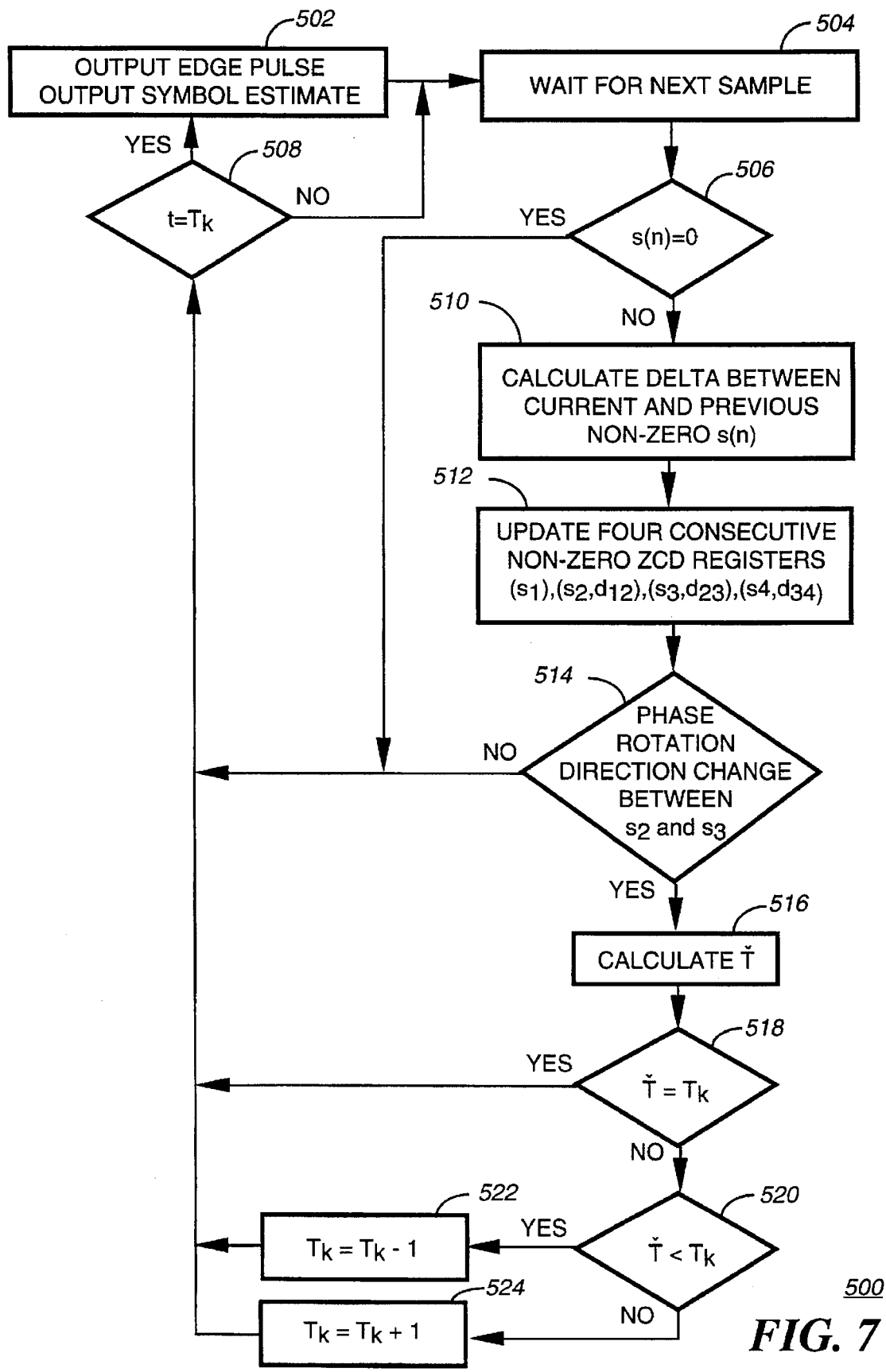
FIG. 7 is a flow chart of a sequentially processed update synchronization algorithm in accordance with a first embodiment of the method of the invention as implementable with the embodiments of FIGS. 1-4.

FIG. 7 is a flow chart for implementing the sequentially processed update method in accordance with the invention.

In accordance with FIG. 7, a program 500 includes a first step 504 in which the synchronizer 123 waits for the next sample. Thereafter, a determination is made whether s(n), which refers to the specific sample number, is equal to zero, step 506. If the answer is "yes," the program proceeds to step 508, in which it is determined if the count t of the internal counter is set equal to $T_k$. t is an internal modulo counter that uses the number of samples per symbol as its modulo number. $T_k$ is the most recently determined symbol transition time based upon $\check{T}$. If t=$T_k$, then the estimated symbol and edge pulse are output, step 502 to step 504. If t≠$T_k$, the program returns directly to step 504.

At step 506, if the answer to the inquiry was "no," the delta, or time difference, between the current and previous non-zero sample s(n) is determined, step 510. Four consecutive non-zero, zero-crossing detector registers are updated, i.e., $(s_1)$, $(s_2, d_{12})$, $(s_3, d_{23})$, $(s_4, d_{34})$, step 512. It is then determined if there was a phase rotation change between $s_2$ and $s_3$, step 514, and if the answer is "yes," the weighted average $\check{T}$ is calculated, step 516. If the answer is "no," the program returns to step 508, as described previously.

Thereafter, it is determined if the weighted average $\check{T}$ equals $T_k$, step 518, and if the answer is "yes," the program returns to step 508. If the answer is "no," it is then determined if the weighted average $\check{T}$ is less than $T_k$, step 520. If the answer is "yes," the program then sets $T_k$ equal to $T_k-1$, step 522. If the answer is "no," then the program sets $T_k$ equal to $T_k+1$, step 524. In both instances, from steps 522 and 524, the program returns to step 508.

Figure 8:
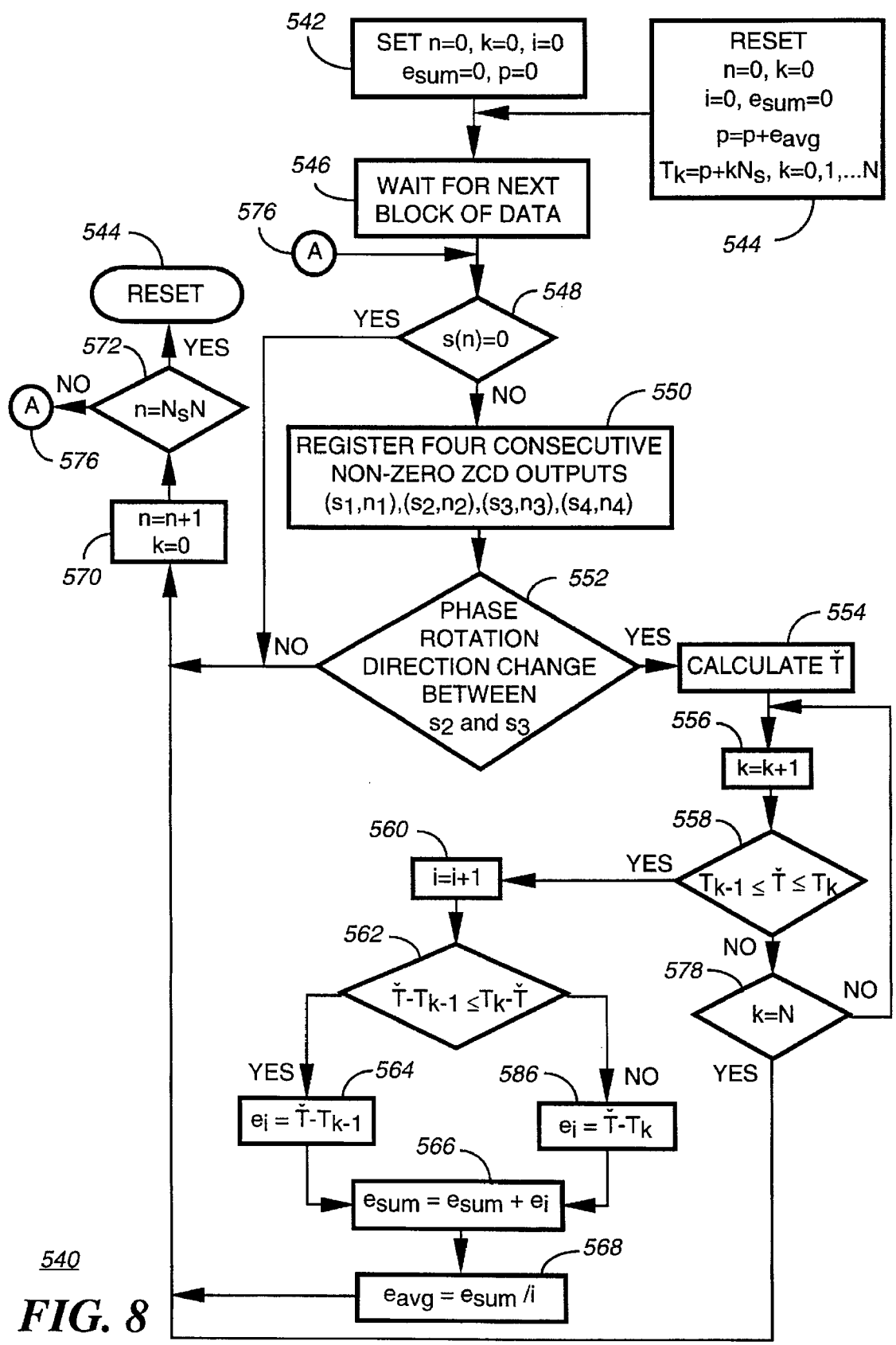
FIG. 8 is a flow chart of a block processed update synchronization algorithm in accordance with a second embodiment of the method in accordance with the invention as implementable with the embodiments of FIGS. 1-4.

The block processing update synchronization algorithm 540 in accordance with another embodiment of the invention is illustrated in FIG. 8. In the algorithm 540, at a first step 542, the values n, k, and i are set equal to zero and the value of $e_{sum}$, and p is set equal to zero.

To facilitate further understanding of the invention, as used herein, the following values are defined:

N is the number of symbols per block of data;

n is the clock sample time index;

k is the index of symbol transition times $T_k$ predicted by the previous block;

i is the index of the phase rotation change during the block;

$e_{sum}$ is the accumulated sum of adjustment errors in a block;

$N_s$ is the number of clock samples per symbol;

p is the offset adjustment for $T_k$ calculated from the previous offset "p" and the new $e_{avg}$; and $e_{avg}$ is $e_{sum}/i$.

Having identified these values, the description of the invention is continued.

A next block of data is received, step 546, and it is determined if s(n) equals 0, step 548. If the answer to this inquiry is "yes," the program proceeds to step 570, which sets n equal to n+1, and k=0, and it is then determined if n is equal to $N_sN$, step 572, i.e., have all the samples in the N symbol block been processed? If the answer is "yes," the registers are reset, step 544, in which n, k, i, and $e_{sum}$ are set equal to zero, p=p+$e_{avg}$, and $T_k$ is set equal to $e_{avg}+kN_s$, where k is an integer from 0 to N. From the reset, the program then returns to step 546, waiting for the next block of data. If the answer is "no," at step 576 the algorithm proceeds back to step 548.

If the answer to the inquiry at step 548 is "no," then at least two, but preferably four, consecutive non-zero, zero-crossing detector outputs are registered, i.e., $(s_1, n_1)$, $(s_2, n_2)$, $(s_3, n_3)$, $(s_4, n_4)$. It is then determined if there was a phase rotation direction change between $s_2$ and $s_3$, step 552, and if the answer is "yes,' the weighted average $\check{T}$ is calculated, step 544. If the answer is "no," the program returns to step 570, as described above.

From step 554, k is set equal to k+1, step 556. It is then determined if $T_{k-1}$ is less than or equal to the weighted average $\check{T}$, and if $T_k$ is greater than or equal to the weighted average $\check{T}$. If the answer to both inquiries is "yes," then i is set equal to i+1, step 560. It is then determined if the weighted average $\check{T}$ minus $T_{k-1}$ is less than or equal to $T_k$ minus the weighted average $\check{T}$, step 562. If the answer is "yes," then $e_i$ is set equal to the weighted average $\check{T}$ minus $T_{k-1}$, step 564. If the answer is "no," then $e_i$ is set equal to the weighted average $\check{T}$ minus $T_k$, step 586.

From steps 564 and 586, $e_{sum}$ is set equal to $e_{sum}+e_i$, step 566, and $e_{avg}$ is set equal to $e_{sum}/i$, step 568, from which the program returns to step 570.

If the answer to the inquiry at step 558 is "no," then it is determined if k equals N, step 578. If the answer at step 578 is "no," then the program returns to step 556. If the answer is "yes," then it returns to step 570.

Figure 9:
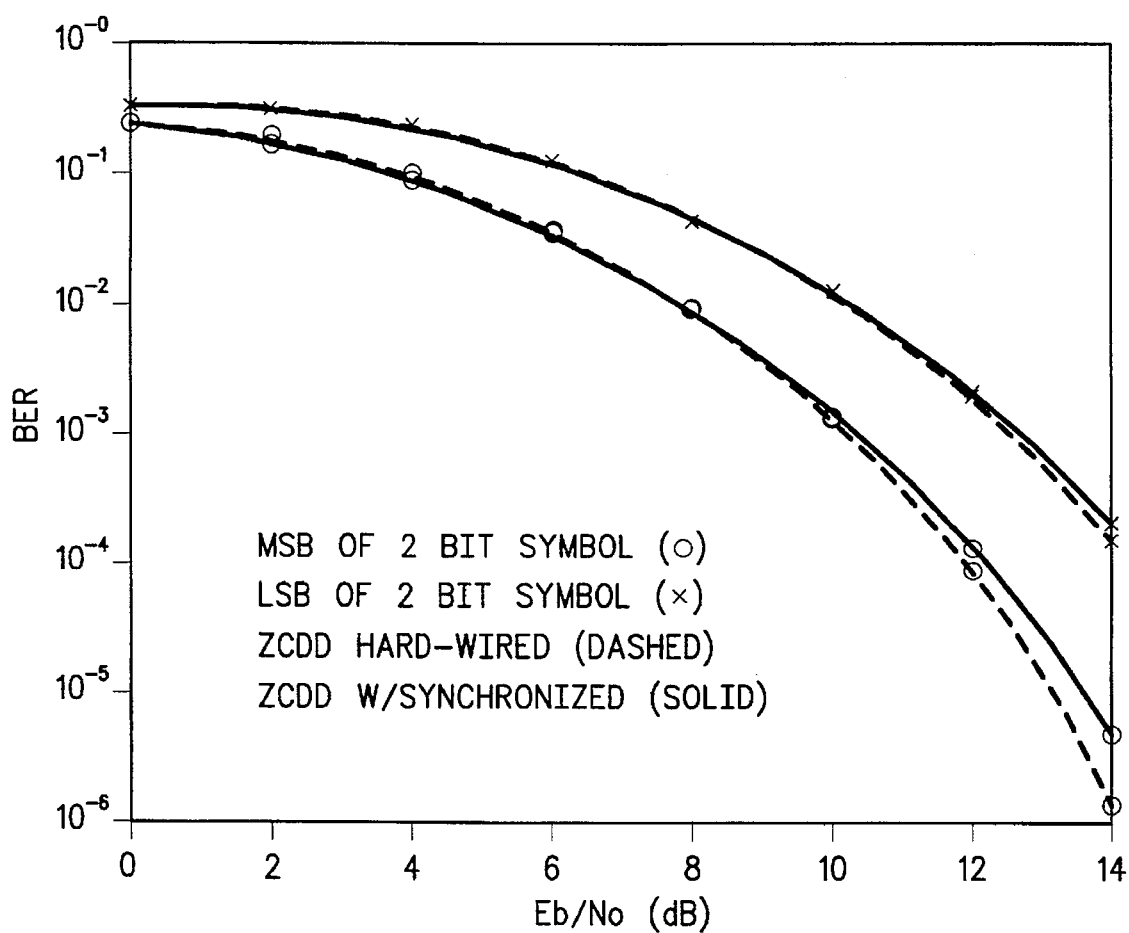
FIG. 9 is a graph illustrating the performance comparison of a zero-crossing differential detector with synchronization in accordance with the invention to that of a zero-crossing differential detector with a hard-wired synchronizer, both operating in a static channel.

FIG. 9 is a graph showing a performance comparison of the zero-crossing differential detector using the method and system of the invention in a static channel as compared to a zero-crossing differential detector with a hard-wired, non-realizable synchronizer in a static channel. FIG. 9 shows that the system of the invention exhibits little loss when compared to the performance of the hard-wired synchronizer system.

The performance of the algorithm of FIG. 7 was compared to that of the same system using a hard-wired, non-realizable synchronization clock, such as is described in co-pending application Ser. No. 08/290,161, filed Aug. 15, 1994, in place of the synchronizer 123. The results of the comparison are set forth herein in FIG. 11, which shows the results for the hard-wired, non-realizable system, and FIG. 12 which shows the result of using the algorithm of FIG. 7. Little loss was exhibited by the system of the invention when compared to the performance of a system using a hard-wired, non-realizable counter. In the tables, $E_b/N_o$ is the ratio of the average energy per bit "$E_b$" to the total noise power "No."

Figure 10:
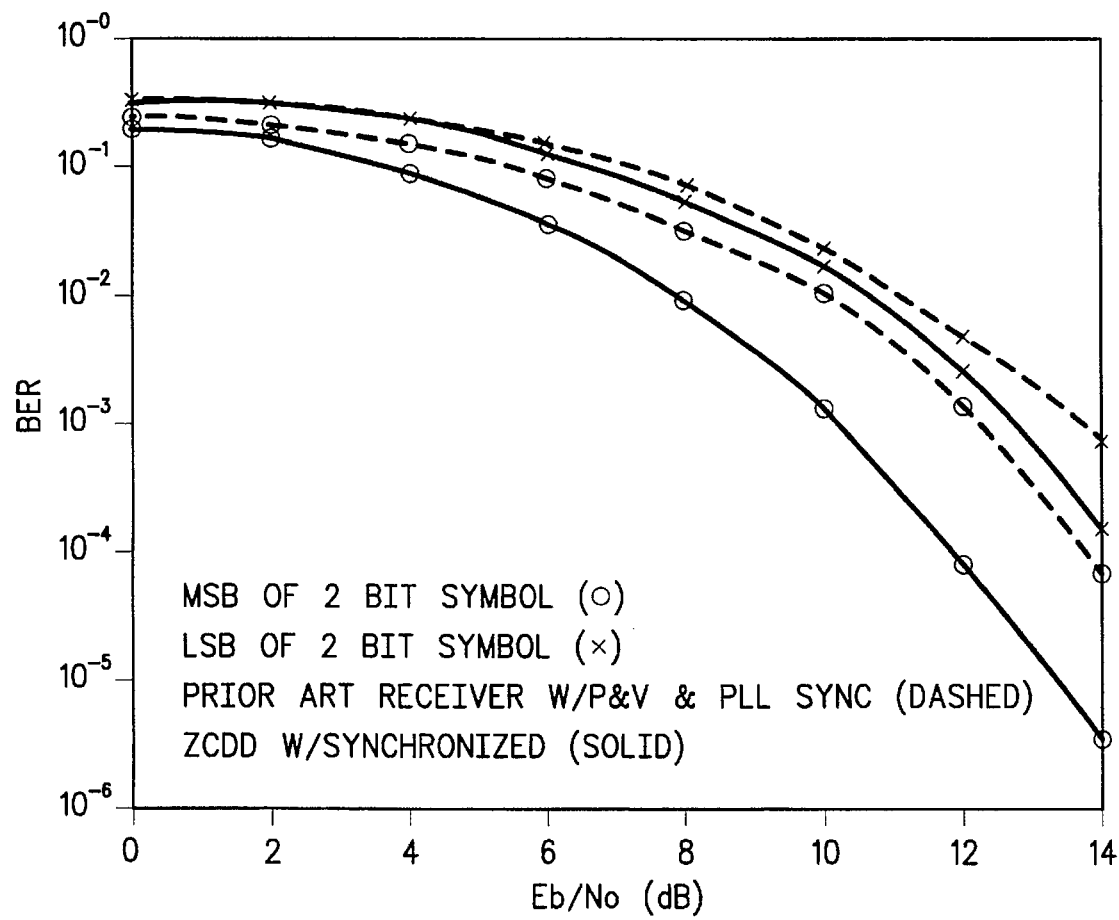
FIG. 10 is a graph illustrating the performance comparison of a zero-crossing differential detector with synchronization in accordance with the invention, to that of a prior art receiver with a peak and valley (P and V) and PLL synchronization.

FIG. 10 is a graph showing a performance comparison of the zero-crossing differential detector using the method and system of the invention as compared to a prior art receiver with a peak and valley (P and V) and PLL synchronizer. The prior art receiver is a conventional frequency discriminator, i.e., frequency-to-voltage converter. It can be seen from FIG. 10 that the method and system of the invention performs better than the prior art receiver (2 dB better for most significant bit (MSB) and 1.50 dB better for least significant bit (LSB), for an average improvement of 1.75 dB).

While comparisons with the algorithm of FIG. 8 were not made, it is expected that the results would be improved over those of the algorithm of FIG. 7, and the method of FIG. 8 may be appropriate for use in accordance with the particular type of modulation selected, as will be readily apparent to those of ordinary skill in the art.

In accordance with the operation of synchronizer 123, as explained with reference to the algorithms of FIGS. 7 and 8, the output of the phase angle estimator 122 is provided to means for extrapolating the contents of the information signal, which includes a decision device 124, in order to produce a demodulated signal to determine the information in the signal. The output from the synchronizer is an edge clock signal, which is passed to the phase angle estimator 122 through line 123a, and optionally, in addition, as shown in dashed lines 123b, 123c, to the decision device 124 or to a controller 126, which is also part of the means for extrapolating, or both. When the output of the synchronizer 123 is passed to the decision device 124, it allows the decision device 124 to conduct demodulation of the input from the phase angle estimator 122, using the output of the synchronizer 123 as a reference clock, to result in a demodulated output signal which is transmitted to the controller 126. In the case where the output from the synchronizer 123 is passed to the controller 126, the controller 126 uses the output as a reference clock to decode the demodulated signal from the decision device 124 into information signals.

As previously discussed, in implementing this invention, while only two opposite phase non-zero, zero-crossing samples can be used to identify a symbol transition, it is preferred that a first two or more non-zero, consecutive samples of at least four samples be the same phase, and the second two or more samples be of the other phase, to reduce the probability of detecting an incorrect symbol transition. The exact number of sample and time information registers varies as a function of the modulation indices and the number of axes generated by the phase axes generators for use by the zero-crossing detector. This was previously described and is self-evident from the reading of the algorithms of FIGS. 7 and 8.

The phase angle estimator 122 determines the phase rotation angle over one symbol duration using the zero-crossing information shown in diagram 400 of FIG. 6. The phase angle estimator 122 uses the edge clock pulse 123a from synchronizer 123 to mark the beginning and ending of a symbol time. It can be appreciated that each edge clock pulse reflecting the end of a symbol time also represents the beginning of another symbol time. At each edge clock pulse, the non-zero, zero-crossing samples that have been accumulated since the previous edge clock pulse are used to form a phase estimate. The registers are then reset to zero accumulation and registering begins again and continues until the next edge clock pulse.

Additionally, the edge clock pulse 123a can be provided directly to the controller 126, as shown by dashed line 123c and/or to the decision device 124, as shown by dashed line 123b. In this case, the edge clock pulses 123b, 123c can now provide a reference clock to the decision device 124 and/or the controller 126.

The received bits are coupled to a controller 126 for further analysis and decoding. The controller 126 proceeds to decode the received signal by combining individual bits and presents the audio portion and data portions therein to a speaker 128 and a display 130, respectively.

As in the case with co-pending application Ser. No. 08/290,161, filed Aug. 15, 1994, a significant benefit of this invention and that of the referenced application over the prior art is immediately noticed here. The system of this invention is capable of demodulating multi-level digital signals and is not limited to just binary signals. Demodulation of multi-level signals is now possible because the invention provides for both the detection of the direction of the phase rotation angle and the number of zero-crossings. There is no limit to the level of the signals being detected.

It should be noted that it is possible to accommodate signals that have less than 90° phase rotation angle over a symbol time. This provides an improvement over the known prior art. An example of one such system, where the phase rotation angle over a symbol time is often less than 90°, is GMSK. In case of GMSK, more zero-crossings may be generated using summers and subtractors at the output of low pass filters 110, 144. These components combine the outputs of the low pass filters 110, 114, to produce additional signals 45° and 135° away from the i signal, similar to what is illustrated in FIG. 5, and further shown in the block diagram of FIG. 2 hereto. Such a scheme provides for two additional phase axes, thereby increasing the number of zero-crossings by a factor of two.

Figure 2:
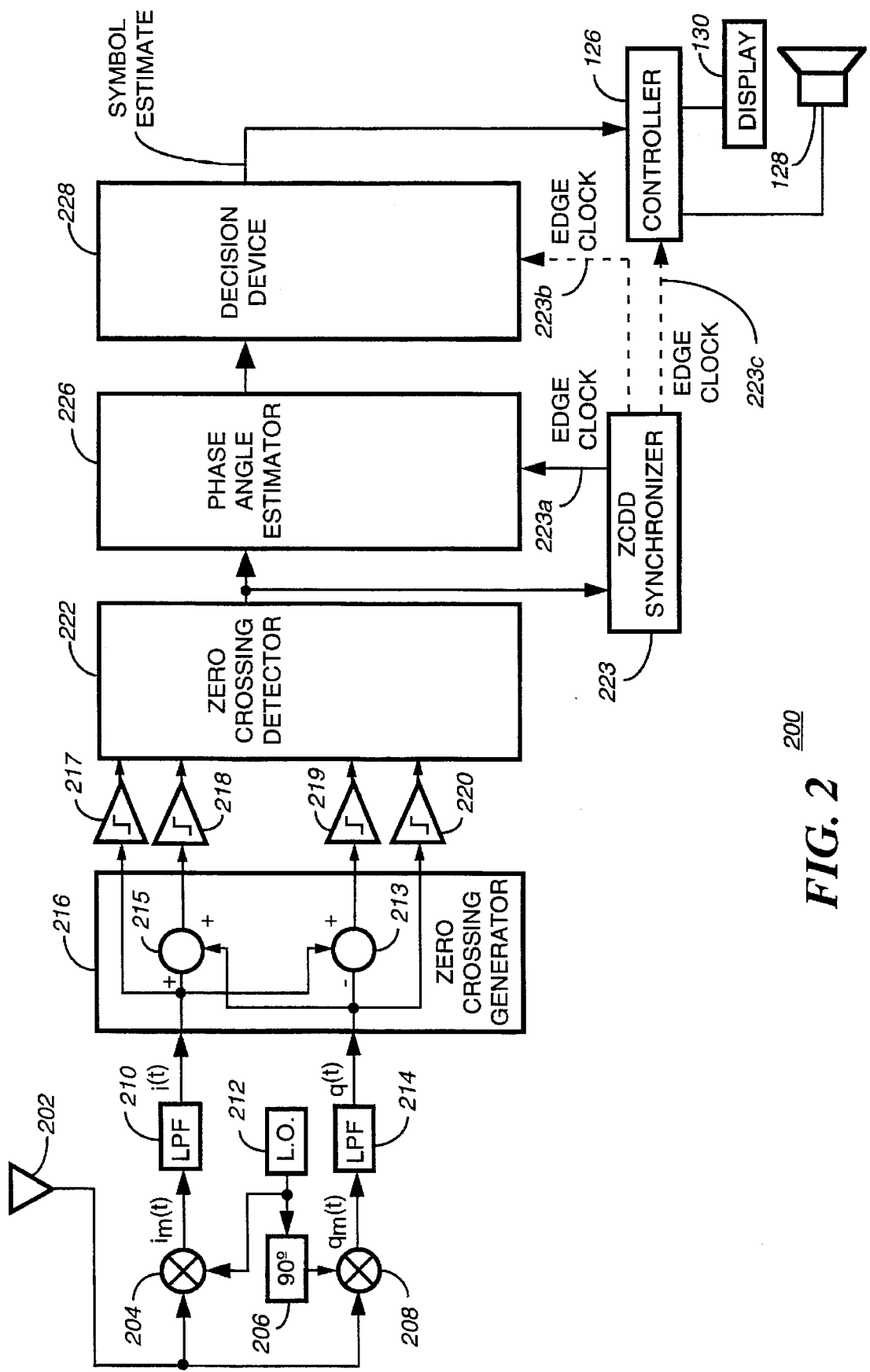
FIG. 2 shows a block diagram of a second embodiment of the communication device in accordance with the present invention.

Referring to FIG. 2, an alternative embodiment 200 of the invention is shown, similar to that of FIG. 1, in which a received signal is coupled from an antenna 202 to a pair of mixers 204, 208. A local oscillator 212 provides a local oscillator signal for mixers 204, 208 directly through a phase shifter 206, respectively. Low pass filters, i.e., LPFs, 210, 214 remove high-frequency components from the mixed outputs to produce the first in-phase and out-of-phase components i and q, respectively. These two signals are then coupled to an efficient zero-crossing generator 216. The generator 216 manipulates the i and q signals to generate additional zero-crossings. In the preferred embodiment, the manipulating of the i and q signals include adding and subtracting them in a summer 215 and a subtractor 213, respectively. The function of adding and subtracting the i and q channels results in two new in-phase and out-of-phase signals 45° and 135° away from the i channel. This finding may be mathematically proven as follows.

In general, a received radio frequency, i.e., RF signal coupled from the antenna 202, is mixed with $\cos(w_c t)$ and $-\sin(w_c t)$ to generate i and q signals at the outputs of mixers 204 and 208, respectively. When the received RF signal is represented as $\cos(w_c t + q(t))$, the mixing operation may be mathematically described as:

$$i_m(t) = \cos(w_c t + q(t))\cos(w_c t) \quad (1)$$
$$= 1/2[\cos(2w_c t + q(t)) + \cos(q(t))]$$

The signal is filtered via filters 210, 214. The filtered signals are represented as:

$$i(t) = \cos(q(t)) \quad (2)$$
$$q(t) = \cos(q((t) - 90°)) \quad (3)$$
$$= \sin(q(t)) \quad (4)$$

The filtered signals are applied to limiters 217, 218, 219, and 220 before being coupled to a zero-crossing detector 222. These limiters provide zero-crossing information on the i and q channels. The filtered signals are added and subtracted at the summer 215 and the subtractor 213, respectively, to produce:

$$i_1(t) = \cos(q(t) - 45°) \quad (5)$$
$$q_1(t) = \cos(q((t) - 135°)) \quad (6)$$
$$= \sin(q(t) - 45°) \quad (7)$$

Note that the creation of these two additional components $i_1(t)$ and $q_1(t)$ may be mathematically explained using the following trigonometric equation:

$$\cos\alpha + \cos\beta = 2\cos((1/2)(\alpha-\beta))\cos((1/2)(\alpha+\beta)) \quad (8)$$

Using this relationship, $i_1(t)$ may be expressed as:

$$i_1(t) = (\cos((\theta(t))) + \cos(\theta(t) - 90°)) \quad (9)$$

Equation 9, may be expressed in terms of i(t) and q(t) using equations 2 and 3:

$$i_1(t) = (i(t) + q(t)) \quad (10)$$

Similarly, $q_1$ may be generated using the following equation:

$$q_1(t) = (-i(t) + q(t)) \quad (11)$$

Equations 10 and 11 indicate that $i_1(t)$ and $q_1(t)$ may be generated by summing and subtracting i(t) and q(t). It is noted that the output of the summer 215 and subtractor 213 produce unsealed signals. This result is produced since the i and q signals are added in the form of vectors. This function could simply be accomplished through appropriate amplification and/or attenuation in the summer 215 and subtractor 213.

The second in-phase $i_1(t)$ and quadrature $q_1(t)$ components result in additional zero-crossings. The outputs of the summer 215 and the subtractor 213 are coupled to the zero-crossing detector 222 through the limiters 218 and 219, respectively. These limiters and limiters 217 and 220 provide the detector 218 with a total of four phase signals which are used to detect additional zero-crossings therein. The detection of zero-crossings may be accomplished via D flip-flops having a clock input with an edge trigger.

A benefit of generating additional zero-crossings using the zero-crossing generator 216 is the elimination of additional mixers, phase shifters and filters as suggested by the prior art. The elimination of these additional components results in significant current savings which is highly desired in portable communication devices. The summer and the subtractor which provide the additional in-phase and out-of-phase components are traditionally low current consuming devices as compared to mixers.

Similar to the device 100 of FIG. 1, the detected zero-crossings are used by phase angle estimator 226, synchronizer 223, and decision device 228, to provide a symbol estimate to determine the contents of the information signal. The symbol estimate is further decoded at a controller 126, to present the information to a speaker 128 and/or display 130, in accordance with its contents. As with FIG. 1, the edge clock pulse can be passed directly to the phase angle estimator 226, as edge clock pulse 223a, and optionally additionally to decision device 228 and/or controller 126, as shown in dashed line as edge clock pulses 223b and 223c.

Figure 3:
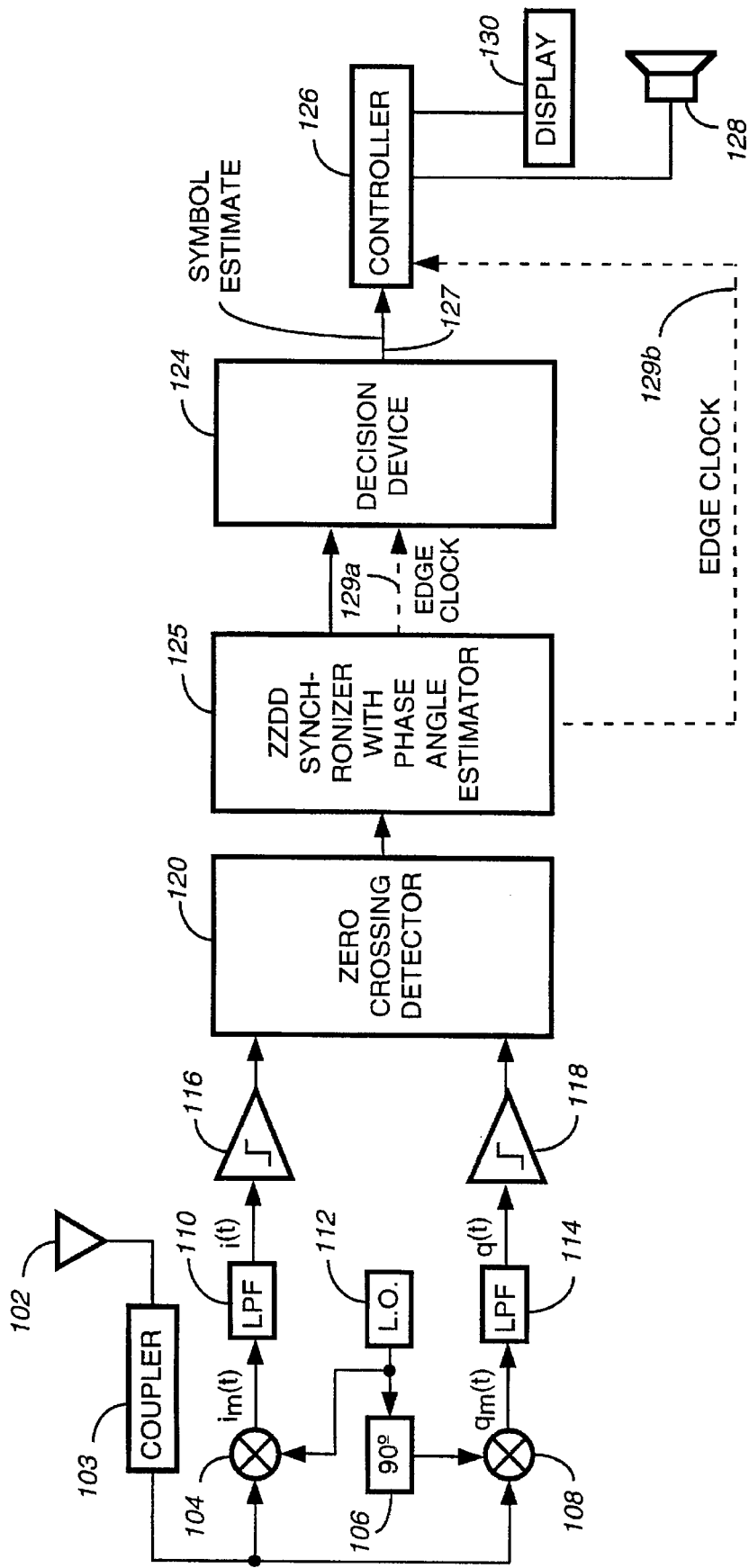
FIG. 3 shows a block diagram of a third embodiment of a communication device in accordance with the present invention.
Figure 4:
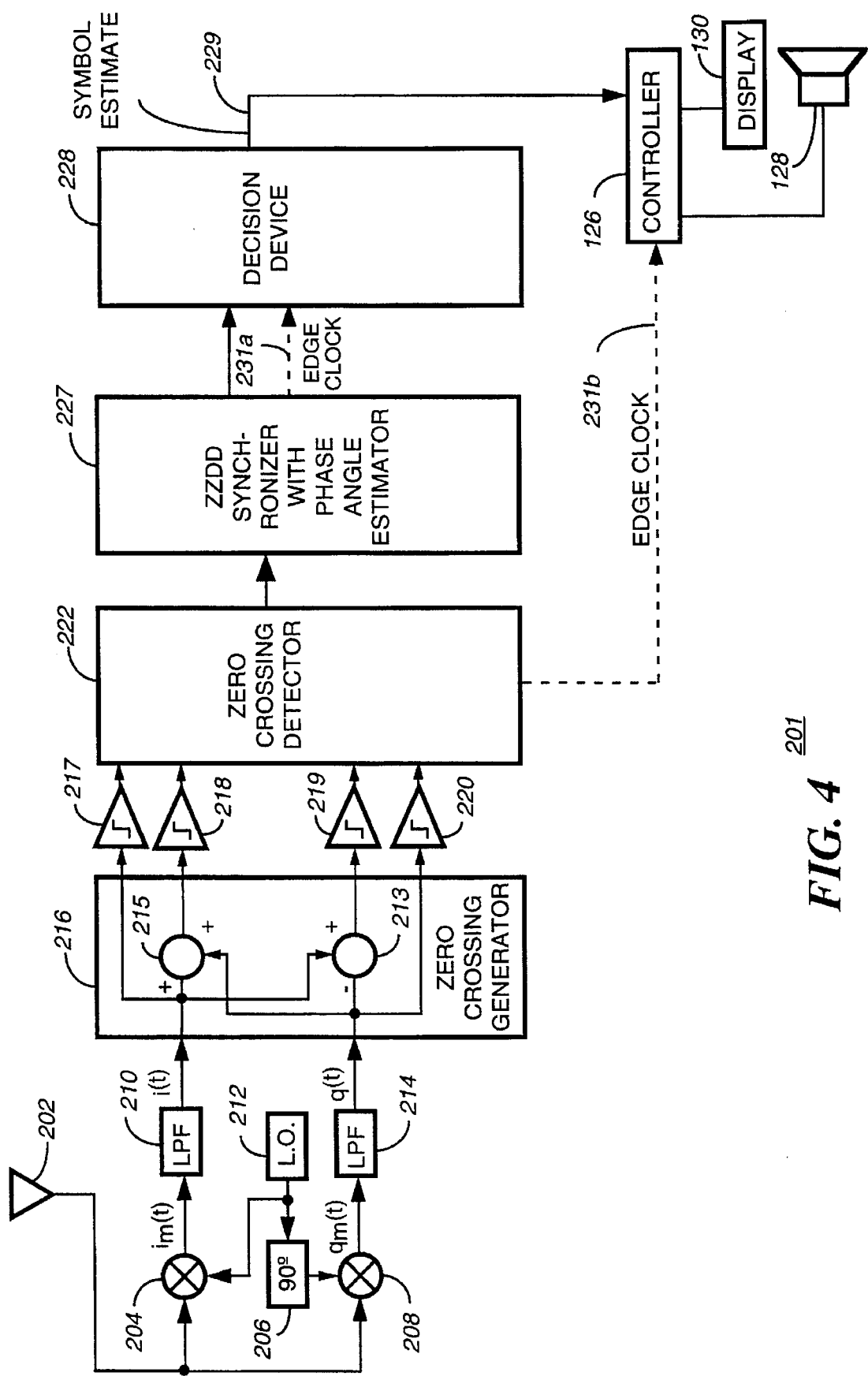
FIG. 4 shows a block diagram of a fourth embodiment of a communication device in accordance with the present invention.
Figure 13:
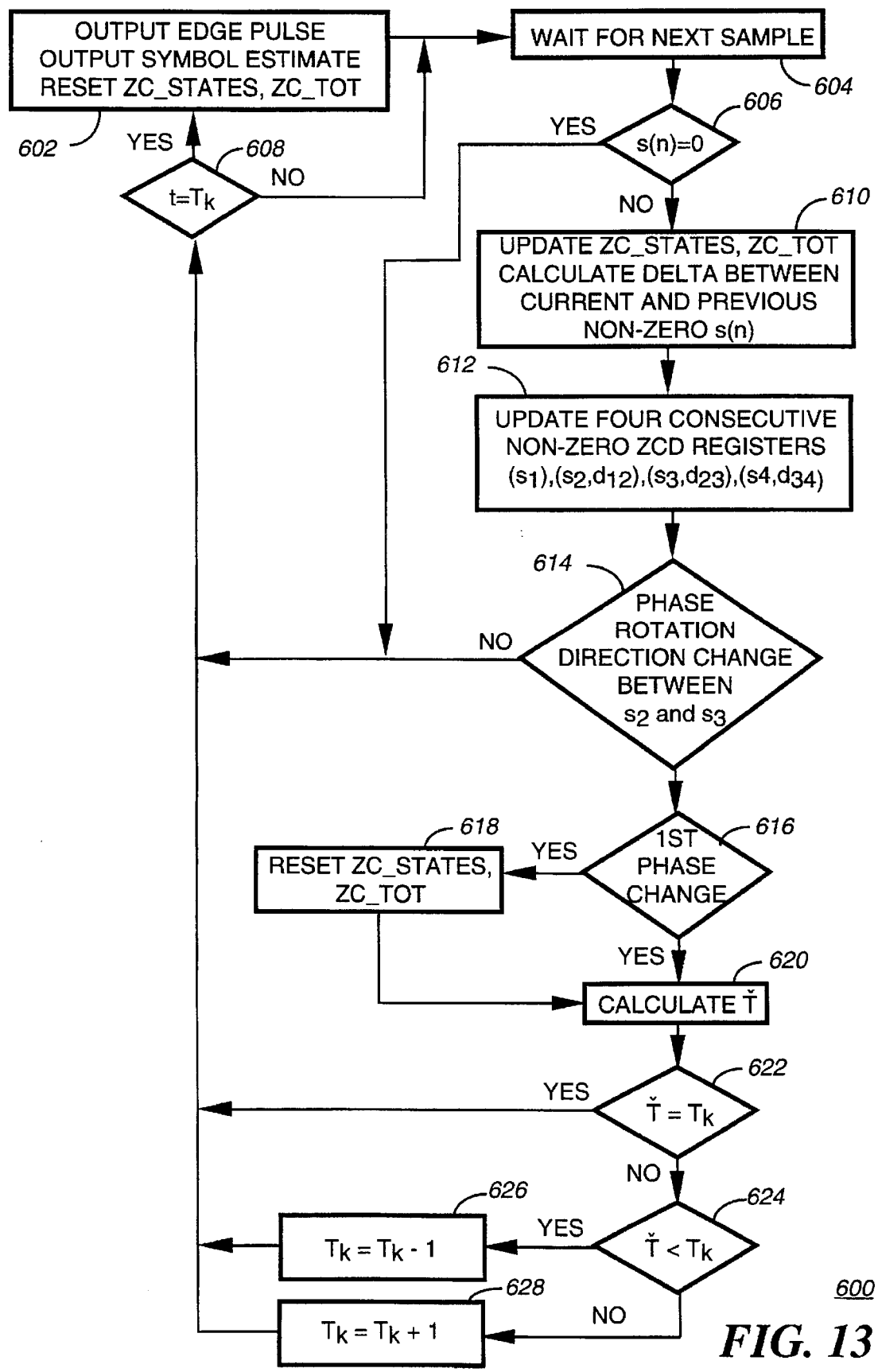
FIG. 13 is a flow chart illustrating a zero-crossing differential detector synchronization algorithm for a system incorporating the synchronization algorithm into a decision device in accordance with the embodiments of FIGS. 3 and 4.

Another embodiment of the invention is further illustrated by FIGS. 3, 4, and 13, in which the means for accumulating, i.e., the phase angle estimator 122, 226, and the means for estimating a symbol transition time, i.e., the synchronizer 123, 223, of the device of FIGS. 1 and 2, is combined into a single means for accumulating all of the zero-crossings, estimating the phase angle rotation of the information signal based upon the accumulated zero-crossings, and generating an edge clock signal representative of symbol transition time, i.e., the synchronizer with phase angle estimator 125, 227, as shown in FIGS. 3 and 4, respectively, and showing third and fourth embodiments 101, 201, respectively. From the combined synchronizer with phase angle estimator 125, 227, is passed an estimated phase angle, and optionally an edge clock signal 129a, 231a (as shown in dashed lines), to means for decoding the estimated phase rotation, which includes the decision device 124, 228, to determine a symbol estimate. Also, as shown in dashed lines 129b, 231b, the edge clock signal can optionally be passed to another part of the means for decoding which includes controller 126 to provide a reference clock thereto. Alternatively, the edge clock signal can be used to operate on the system directly in the combined synchronizer with phase angle estimator 125, 227, so that a clocked phase angle estimate can be passed to decision device 124, 228, which can then in turn pass a clocked symbol estimate to the controller 126. In this case, a separate edge clock signal is not passed directly either to the decision device 124, 128 or the controller 126.

In this embodiment, a further improvement is provided over the system of FIGS. 1 and 2, as appreciated hereafter.

More specifically, when implementing the system of FIGS. 1 and 2, the first two symbols at the beginning of each message are lost. The loss of a couple of symbols at the beginning of a message does not typically result in first order error effects on recovered data. However, second order error effects on recovered data could occur as a result of AFC (Automatic Frequency Control) and AGC (Automatic Gain Control) lock times being increased. The first symbol lost is due to the nature of the synchronization scheme and cannot be recovered. The second symbol lost results from the limited control between the synchronizer and the decision device, and can be recovered by increasing the control between the two. This increase in control, however, increases the complexity as well. Alternatively, since most of the information generated internally to the phase angle estimator 122, 226, is a necessary part of the synchronizer 123, 223, the remaining portions of the phase angle estimator can be combined with the synchronizer to result in a process which is more efficient and less complex than that of FIGS. 7 and 8, as implemented in the systems of FIGS. 1 and 2, in the manner discussed previously. The embodiments of FIGS. 3, 4, and 13 implement and modify the techniques of FIGS. 7 and 8, and combine the phase angle estimator with the synchronizer, in the manner described with reference to FIG. 13 hereafter.

In implementing this embodiment of the system of the invention, the operation thereof provides that when the synchronizer registers a detected zero-crossing, the phase of that zero-crossing is stored in a buffer or accumulator. The buffer is an internal memory in the synchronizer/phase angle estimator 125, 227. Thereafter, at the same time the synchronizer/phase angle estimator 125, 227, generates an edge clock pulse, all the phases are summed and the sum or accumulated phase of the zero-crossings is output. The buffer or accumulator is then reset. The added control of the system is easily accomplished by monitoring for the first phase rotation change, and then resetting the buffer or accumulator appropriately. It is important to appreciate that this is not the same reset that occurs after the edge pulse is generated.

By incorporating the phase angle estimator with the synchronizer, computational complexity is decreased. At the same time the extra control needed to recover the second lost symbol can be easily implemented thereby avoiding second order error effects on recovered data.

As may be appreciated from a reading of the flow chart of FIG. 13, it is the same as that of FIG. 7 except for several steps. Specifically, the steps of the flow charts of FIG. 7 and FIG. 13 correspond to each other as set forth in the following table:

| FIG. 7 | FIG. 13 |
| --- | --- |
| 504 | 604 |
| 506 | 606 |
| 508 | 608 |
| 512 | 612 |
| 514 | 614 |
| 516 | 620 |
| 518 | 622 |
| 520 | 624 |
| 522 | 626 |
| 524 | 628 |

As described below, additional steps 602, 610, 616, and 618 differ from the flow chart of FIG. 7.

In step 602, an additional reset of the zc_states and zc_tot is performed as described in additional step 610. In step 610 the zc_states and zc_tot are updated. In this step, zc_tot is the total number of zero-crossings detected in a symbol time, and zc_states are the phases of each of the zero-crossings, i.e., + or −(+1 or −1) to be summed. At step 616 it is determined if there has been a first-phase change, and if the answer is "yes," then zc_states and zc_tot are reset, step 618, and the program then proceeds to step 620. If the answer to the inquiry at step 616 is "no," then the program proceeds directly to step 620, which corresponds to step 516 described previously with reference to FIG. 7. Thus, this embodiment provides a further improvement over that of FIGS. 1, 3, 7, and 8 by further simplifying the system in a manner in which second order errors are avoided.

Having thus described the invention, the same will become better understood from the appended claims in which it is described in a non-limiting manner.

What is claimed is:

1. A communication device for receiving an information signal, comprising:

a first mixer for producing an in-phase component;

a second mixer for producing at least one out-of-phase component;

a multi-level detector for detecting the contents of the information signal using the in-phase and out-of-phase components, the detector comprising:

means for detecting the direction of instantaneous phase rotation at zero-crossings;

means for accumulating all the zero-crossings, and based upon a symbol edge clock signal received, estimating phase angle rotation of the information signal based upon all of the accumulated zero-crossings since a previous edge clock signal was received;

means for estimating a symbol transition time to generate an edge clock signal for transmission to said means for accumulating only when at least two, non-zero consecutive zero-crossing samples are detected in which the first sample is of one phase and the second sample is of the other phase; and means for decoding the contents of the information signal from the estimated phase angle rotation.

2. The communication device of claim 1 wherein:

said means for estimating a symbol transition time is adapted for calculating a symbol transition time $\check{T}$ as a weighted average of the times of detection of the at least two, non-zero consecutive crossing samples detected; and said means for estimating a symbol transition time being adapted for generating said edge clock signal at a time equal to the estimated symbol transition time $\check{T}$.

3. The communication device of claim 2 wherein:

said means for estimating said symbol transition time $\check{T}$ as a weighted average is adapted for calculating the symbol transition $\check{T}$ based upon at least four, non-zero consecutive zero-crossing samples, in which the first two samples are of one phase and the second two samples are of the other phase, and said symbol transition time is calculated as:

$$\check{T} = \text{int}\left( \frac{n_4(n_6 - n_5) + n_5(n_4 - n_3)}{(n_4 - n_3) + (n_6 - n_5)} \right)$$

wherein "int" is the truncated equivalent of the real valued expression of $\check{T}$, and $n_3$, $n_4$, $n_5$, and $n_6$ are the times corresponding to registered non-zero, zero-crossing samples.

4. The communication device of claim 1 wherein said means for estimating a symbol transition time comprises a synchronizer for generating an edge clock pulse for each symbol estimate which is determined from at least four, non-zero consecutive zero-crossing samples in which the first two samples are of one phase and the second two samples are of the other phase.

5. The communication device of claim 1 wherein:

said means for accumulating and estimating comprises a phase angle estimator for receiving input from said means for detecting indicative of zero-crossings, and for determining phase angle rotation from said input indicative of zero-crossings, for providing an output to said means for decoding indicative of phase angle rotation of the information signal;

said means for estimating a symbol transition time comprises a synchronizer coupled to the output of said means for detecting, for receiving said output from said means for detecting for providing a synchronization output to said phase angle estimator for synchronizing said output indicative of phase angle rotation of the information signal; and said means for decoding comprises a decision device coupled to said phase angle estimator for receiving said output therefrom for producing a demodulated signal, and a controller for determining the contents of the information signal from said demodulated signal.

6. The communication device of claim 5 wherein the output of said synchronizer is coupled to said decision device for having said decision device conduct demodulation of said input from said phase angle estimator indicative of phase angle rotation, using the output of said synchronizer as a reference clock, to result in an output demodulated signal from said decision device to said controller.

7. The communication device of claim 5 wherein the output of said synchronizer is coupled to said controller for having said controller use the output of said synchronizer as a reference clock to decode the demodulated signal from said decision device into information signals.

8. The communication device of claim 1 wherein said means for estimating a symbol transition time is adapted for estimating a symbol transition time only when more than four, non-zero consecutive zero-crossing samples are detected, in which at least the first three samples are of one phase and the following samples are of the other phase.

9. A communication device for receiving an information signal, comprising:

a first mixer for producing a first, in-phase component;

a second mixer for producing an out-of-phase component;

a multi-level detector for detecting the contents of the information using the in-phase and out-of-phase components, the detector comprising:

means for detecting the direction of instantaneous phase rotation at zero-crossings;

means for accumulating all of the zero-crossings, based upon a symbol transition time, for generating an edge clock signal representative of the symbol transition time, only when at least two, non-zero consecutive zero-crossing samples are detected in which the first sample is of one phase and the second sample is of the other phase, and for estimating phase angle rotation of the information signal based upon all of the accumulated zero-crossings since a previously generated edge clock signal; and means for decoding the estimated phase angle rotation of the information signal for determining the contents thereof.

10. The communication device of claim 9 wherein:

said means for estimating a symbol transition time is adapted for calculating a symbol transition time $\check{T}$ as a weighted average of the times of detection of the at least two, non-zero consecutive crossing samples detected; and said means for estimating a symbol transition time being adapted for generating said edge clock signal at a time equal to the estimated symbol transition time $\check{T}$.

11. The communication device of claim 9 wherein:

said means for estimating said symbol transition time $\check{T}$ as a weighted average is adapted for calculating the symbol transition $\check{T}$ based upon at least four, non-zero consecutive zero-crossing samples, in which the first two samples are of one phase and the second two samples are of the other phase, and said symbol transition time is calculated as:

$$\check{T} = \text{int}\left( \frac{n_4(n_6 - n_5) + n_5(n_4 - n_3)}{(n_4 - n_3) + (n_6 - n_5)} \right)$$

wherein "int" is the truncated equivalent of the real valued expression of $\check{T}$, and $n_3$, $n_4$, $n_5$, and $n_6$ are the times corresponding to registered non-zero, zero-crossing samples.

12. The communication device of claim 9 wherein said means for accumulating, generating, and estimating comprises:

a combined phase angle estimator and synchronizer for receiving input from said means for detecting which is indicative of zero-crossings, and for determining phase angle rotation from said output indicative of zero-crossings.

13. The communication device of claim 12 wherein said means for decoding comprises:

a decision device coupled to said combined phase angle estimator and synchronizer for receiving said output therefrom for producing a demodulated signal; and a controller coupled to said decision device for determining the contents of the information signal from said demodulated signal.

14. The communication device of claim 9 wherein said means for accumulating, generating, and estimating is adapted for generating an edge clock signal only when at least more than four, non-zero consecutive zero-crossing samples are detected in which at least the first three samples are of one phase and the following samples are of the other phase.

15. A method for detecting the contents of an information signal, comprising the steps of:

generating an IF signal having in-phase and out-of-phase components;

monitoring the in-phase and out-of-phase components to determine instantaneous phase rotation direction at zero-crossings;

accumulating all of the zero-crossings of the information signal, generating an edge clock signal only when at least two, non-zero consecutive zero-crossing samples are detected in which the first sample is of one phase and the second sample is of the other phase, and estimating phase angle rotation of the information signal based upon a generated edge clock signal, and from all of the zero-crossings since a previously generated edge clock signal; and decoding the contents of the information signal from the estimated phase angle rotation.

16. The method of claim 15 further comprising storing the zero crossings, summing the zero-crossings, and outputting the sum of the zero-crossings, which is indicative of phase rotation angle, for decoding the contents of the information signal.

17. The method of claim 16 further comprising the step of decoding the contents of the information signal from the sum of the zero-crossings.

18. The method of claim 16 wherein said edge clock signal is generated at a symbol transition time $\check{T}$, and comprising determining the symbol transition time $\check{T}$ as a weighted average of the times of detection of the at least two, non-zero consecutive crossing samples detected.

19. The method of claim 18 further comprising:
generating an edge clock signal only when at least four, non-zero consecutive zero-crossing samples are detected in which at least the first two samples are of one phase and the next two samples are of the other phase;
starting the summing of the zero-crossings based upon said generated edge clock signal for generating a synchronized sum of the zero-crossing output indicative of phase rotation angle, for conducting said decoding; and
generating said edge clock signal at a time corresponding to an estimated symbol transition time $\check{T}$, which is a weighted average, wherein:

$$\check{T} = \text{int}\left( \frac{n_4(n_6 - n_5) + n_5(n_4 - n_3)}{(n_4 - n_3) + (n_6 - n_5)} \right)$$

in which "int" is the truncated equivalent of the real value expression of $\check{T}$ and $n_3$, $n_4$, $n_5$, and $n_6$ are the times corresponding to registered non-zero, zero-crossing samples.

20. The communication device of claim 15 further comprising generating an edge clock signal only when more than four, non-zero consecutive zero-crossing samples are detected in which at least the first three samples are of one phase and the following samples are of the other phase.

* * * * *